United States Patent [19]

Kauder et al.

[11] Patent Number: 4,508,863

[45] Date of Patent: Apr. 2, 1985

[54] STABILIZATION OF POLYVINYL CHLORIDE

[75] Inventors: Otto S. Kauder, New York; Charles Keeley, Wantagh, both of N.Y.

[73] Assignee: Argus Chemical Corporation, Brooklyn, N.Y.

[21] Appl. No.: 578,936

[22] Filed: Feb. 10, 1984

Related U.S. Application Data

[63] Continuation of Ser. No. 511,432, Jul. 6, 1983, abandoned.

[51] Int. Cl.³ .......................... C08K 5/57; C08K 5/09; C08K 9/04
[52] U.S. Cl. .................................. 524/181; 252/401; 252/404; 252/405; 252/406; 524/327; 524/399; 524/490; 524/491; 524/567
[58] Field of Search ............... 252/401, 404, 405, 406; 524/181, 327, 399, 490, 491; 523/333, 175

[56] References Cited

U.S. PATENT DOCUMENTS

| | | | |
|---|---|---|---|
| 3,287,299 | 11/1966 | Canarios | 524/399 |
| 3,326,828 | 6/1967 | Melio | 524/399 |
| 3,682,853 | 8/1972 | Barie et al. | 524/399 |
| 3,728,282 | 4/1973 | Barie et al. | 524/327 |
| 4,085,056 | 4/1978 | Schenach | 252/59 |
| 4,159,973 | 7/1979 | Hoch et al. | 524/327 |
| 4,178,282 | 12/1979 | Bae | 524/327 |
| 4,213,001 | 7/1980 | MadgavKar et al. | 585/510 |
| 4,218,253 | 8/1980 | Kim | 524/490 |
| 4,401,779 | 8/1983 | Bae et al. | 524/327 |

Primary Examiner—Veronica P. Hoke

[57] ABSTRACT

The resistance to deterioration of polyvinyl chloride resins when heated and worked is improved by combinations of polyvinyl chloride resin stabilizers and alpha-olefin oligomers obtained by oligomerization of a 1-olefin having from six to about twelve carbon atoms, and having a highly branched chain with alkyl substituents of at least two carbon atoms.

17 Claims, No Drawings

STABILIZATION OF POLYVINYL CHLORIDE

This is a continuation of application Ser. No. 511,432, filed July 6, 1983, now abandoned.

It has long been known that certain types of compounds, generally classified as polyvinyl chloride resin stabilizers, improve the resistance to deterioration when heated of polyvinyl chloride resins. The degradation of polyvinyl chloride on heating is generally explained as the result of liberation of hydrogen chloride due to a "stripping" reaction that, once it gets started, travels along the resin molecule. Polyvinyl chloride resin stabilizers assist in inhibiting this reaction, in part by reaction with hydrogen chloride, which once it is formed aids the "stripping" reaction, and perhaps in part by inhibiting the release of hydrogen chloride by interfering with the "stripping" reaction. In any case, the degradation of polyvinyl chloride resins is generally attributed to chemical decomposition reactions, which the stabilizers inhibit.

It has now been discovered that there is another factor, previously unsuspected, that contributes to instability of polyvinyl chloride resins when heated. Polyvinyl chloride resins are heated in order to soften them, and thus make it possible to work them, and so convert them into selected physical forms and shapes, as in the molding of parisons, sheeting, and extruding piping and siding. Such physical working of the polymer chains when heated, it has now been discovered, also contributes to instability. Polyvinyl chloride polymer chains have appendant chlorine groups, and physical shearing forces applied as polymer chains slide past each other during working may play a part in the "stripping" reaction.

If in addition to the usual polyvinyl chloride resin stabilizer there is incorporated in the resin composition a highly branched alpha-olefin oligomer obtained by oligomerization of a 1-olefin having from about six to about twelve carbon atoms, and having lubricant properties, the stabilizing effectiveness of the polyvinyl chloride resin stabilizer during heating and working of the polymer is greatly enhanced, giving an appearance of a synergistic stabilizing effect. Since however the oligomer lubricant is not itself a stabilizer, and cannot in any way contribute chemically to inhibition of the "stripping" reaction, or the taking up of hydrogen chloride, the reaction product of the "stripping" reaction, the effect of the oligomer can only be explained as due to some physical effect that diminishes the tendency of the working to destabilize the polymer, and so cooperates with the polyvinyl chloride resin stabilizer in improving the resistance to deterioration.

The effect cannot however be only a lubricant effect, since not all hydrocarbon lubricants are effective. Only highly branched alpha-olefin oligomers obtained by oligomerization of a 1-olefin having from about six to about twelve carbon atoms markedly enhance the stabilizing effect of the polyvinyl chloride resin stabilizer, and the branches have to have at least two carbon atoms, i.e., ethyl or higher, such as propyl, butyl, amyl, hexyl, heptyl, octyl, up to about twelve carbon atoms. Methyl branches are insufficient. Polyisobutylene gives only a slight effect, if any. The branches also must be closely spaced, suggesting a stereospecific effect of covering over or shielding the chlorine groups of the polyvinyl chloride polymer chain from injury during working.

In accordance with the present invention, therefore, polyvinyl chloride resin stabilizers are combined with highly branched alpha-olefin oligomers obtained by oligomerization of a 1-olefin having from about six to about twelve carbon atoms, and with alkyl branches of at least two carbon atoms, the oligomer being in an amount which enhances the stabilizing effect of the polyvinyl chloride resin stabilizer. The combination of stabilizer and oligomer appreciably lessens the deterioration of the polymer when heated and worked, so that the inhibiting effect of the two together is greater than the effect of the stabilizer alone. The oligomer alone shows no stabilizing effect at all. These stabilizer compositions are preferably liquids, and still more preferably homogeneous stable liquids at room temperature.

The invention also provides rigid, i.e. unplasticized, polyvinyl chloride resin compositions having an enhanced resistance to deterioration when heated and worked, comprising a polyvinyl chloride resin, a polyvinyl chloride resin stabilizer and a highly branched alpha-olefin oligomer obtained by oligomerization of a 1-olefin having from about six to about twelve carbon atoms, and with alkyl branches of at least two carbon atoms, the oligomer being in an amount to enhance the stabilizing effect of the polyvinyl chloride resin stabilizer.

It is important to distinguish between the physical effect of the oligomer of the invention and the plasticizing effect of a polyvinyl chloride resin plasticizer. A polyvinyl chloride resin plasticizer softens the polymer, and reduces the temperature at which the polymer can be worked, in effect increasing plasticity. Thus, plasticized polyvinyl chloride resins normally can be worked at temperatures of 325° to 350° F., whereas rigid polyvinyl chloride polymer containing less than 10% plasticizer cannot be worked until temperatures of approximately 375° F. are reached. Since plasticized polymer is more easily worked at a lower temperature, it poses less of a stability problem than rigid polymer. The highly branched oligomer of the invention show no enhancing effect in plasticized polymer, evidently because the physical shearing forces or whatever is the cause are not damaging under these working conditions. However, polyvinyl chloride resin plasticizers cannot be used in rigids for any plasticizing effect, since in the amounts required for such an effect the polymer is no longer rigid, and plasticizers do not display any stabilization-enhancing effect on polyvinyl chloride resin stabilizers in plasticized polymer. The effect of the highly branched alpha-olefin oligomers in the compositions of the invention, on the other hand, cannot be attributed to or equated to a plasticizing effect, since the polymer is still a rigid polymer.

The preferred highly branched alipha-olefin oligomers having alkyl substituents of at least two carbon atoms ranging up to about twelve carbon atoms employed in the compositions in accordance with the invention are alpha olefin oligomers obtained by oligomerization of a 1-olefin in the presence of a catalyst such as boron trifluoride, promoted with water, alcohols or carboxylic acids, and anhydrous aluminum chloride or other known oligomerization catalyst. These oligomers are generally prepared from 1-olefins, which may themselves be highly branched, having from about six to about twelve carbon atoms and mixtures thereof, such as 1-hexane, 1-heptene, 2-ethyl-hexane, 1-octene, 1-decene, 1-undecene and 1-dodecene.

The alkyl branches include ethyl, propyl, isopropyl, butyl, isobutyl, tert-butyl, amyl, isoamyl, hexyl, isohexyl, heptyl, isoheptyl, octyl, 2-ethylhexyl, isooctyl, nonyl, isononyl, decyl, undecyl, and dodecyl. These are usually present in complex mixtures of branches along the chain, but the branches should be numerous, and are not more distantly spaced apart than the chain length of the starting monomer.

The oligomer products of 1-decene and mixtures including 1-decene with other 1-olefins are preferred.

These oligomer products are complex mixtures of dimers, trimers, tetramers, pentamers and higher polymer fractions.

The oligomer is the product of many concurrent reactions occuring at different rates that are differently affected by variations in the reaction parameters. While monomer dimerizes to dimer, and dimer dimerizes to tetramer, the monomer reacts with dimer to form trimer. As monomer dimerizes, monomer is exhausted, the reaction of monomer to yield trimer decreases, but the reaction of dimer to tetramer can significantly increase. The reaction of dimer with trimer to form pentamer will cause the actual decrease of trimer, and so on. Such oligomer products are described for example in U.S. Pat. No. 4,085,056 patented Apr. 18, 1978 to Schenach, and U.S. Pat. No. 4,213,001 patented July 15, 1980 to Madgavkar, Swift and Cupples.

Preferred embodiments of oligomers of 1-decene range in molecular size from $C_{30}$ to about $C_{60}$ and in viscosity at 210° F. of from 4 to 100 centistokes.

Miscibility with the common alkyltin mercaptoester and also barium-cadmium liquid polyvinyl chloride resin stabilizers is found at the lower end of the viscosity range, up to about 15 centistokes. Thus homogeneous liquid stabilizer compositions are obtained with the 4 to 15 centistoke materials and stabilized PVC compositions with 4 to 100 centistoke materials and a separately added stabilizer.

Surprisingly, hydrocarbons derived from olefins having only methyl branches are not as effective, such as, for example, polyisobutylene. The reason for this is not certain, but is perhaps due to some stereospecific effect for which a methyl group is too small. Polyisobutylene gives only a slight enhancing effect with polyvinyl chloride resin stabilizers, unlike the larger branched alpha-olefin oligomers in accordance with the invention.

The highly branched alpha-olefin oligomers of the invention enhance the stabilizing effect of a large group of polyvinyl chloride resin stabilizers. Since the oligomers are liquids the polyvinyl chloride resin stabilizers for combination therewith should form a compatible, preferably stable homogeneous, liquid polyvinyl chloride resin stabilizer composition. The preferred polyvinyl chloride resin stabilizer accordingly is either an organotin compound having linked to tin from one to three alkyl groups having from one to about eighteen carbon atoms, preferably from one to eight carbon atoms, and from one to three organic groups linked to tin through sulfur, such as the alkyl tin mercapto carboxylic acid esters, such as the thioglycolate and thiopropionate, as well as the alkyl tin mercaptoalcohol esters of dicarboxylic acid monoalkyl esters, and the liquid cadmium carboxylates-carbonated barium alkyl phenates.

One class of organotin compounds that are preferred are the organotin mercaptocarboxylic acid esters. These are widely recognized as the most effective organotin stabilizers, having a tin content of about 18% Sn. The position of the organotin mercaptocarboxylic acid esters has been challenged in recent years by the provision of stabilizers containing a higher proportion of tin, from about 21 to about 26% Sn, referred to as the "high efficiency" organotins. The latter are exemplified by the organotin mercaptocarboxylic acid ester sulfides of U.S. Pat. Nos. 3,565,930, 3,565,931 and 3,817,915.

The organotin mercaptocarboxylic acid esters are described in U.S. Pat. No. 3,753,325 to Leistner et al, issued June 26, 1956, U.S. Pat. No. 2,641,596 to Leistner et al, issued June 9, 1953 and U.S. Pat. No. 2,648,650 to Weinberg et al, issued Aug. 11, 1953.

Variations derived from 2-hydroxyethyl and 2-acyloxyethylmercaptans, also referred to as 2-mercaptoethanol and 2-mercaptoethylcarboxylate esters, are described in Stefl et al U.S. Pat. No. 2,731,440, Best U.S. Pat. No. 2,731,484, Ramsden et al. U.S. Pat. No. 2,790,785, Mack et al U.S. Pat. No. 2,809,956, Ramsden et al U.S. Pat. No. 2,830,067, Leistner U.S. Pat. Nos. 2,870,119, 2,870,182, 2,872,468 and 2,883,363, Ramsden U.S. Pat. No. 2,885,415 and British Pat. No. 759,382, Molt U.S. Pat. No. 3,931,263 and German Offenlegungsschrift No. 2,503,554.

Stefl U.S. Pat. No. 2,731,440 patented Jan. 17, 1956 proposed monoorganotin trimercaptides of the formula:

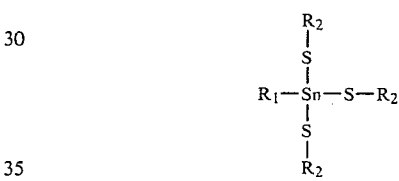

in which formula: $R_1$ and $R_2$ include alkyl having from one to twenty-two carbon atoms.

Leistner and Hecker U.S. Pat. Nos. 2,872,468, patented Feb. 3, 1959 and U.S. Pat. No. 2,883,363, patented Apr. 21, 1959 proposed organotin compounds of the type:

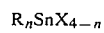

wherein R includes alkyl and X is the radical or an ester of a mercapto alcohol having from two to four carbon atoms with an aliphatic aromatic or hydroaromatic dibasic acid containing from six to twelve carbon atoms, and n for an integral number from 1 to 3.

In this case, the alcohol can be esterified with a dicarboxylic acid, producing products having the type formulae:

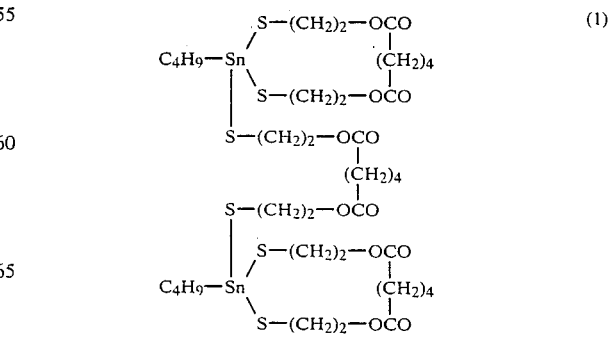

-continued

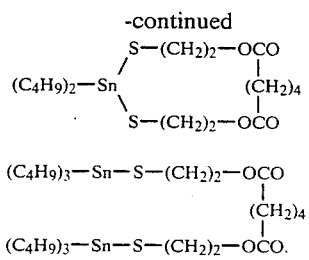
(2)

$(C_4H_9)_3-Sn-S-(CH_2)_2-OCO$ (3)
$\quad\quad\quad\quad\quad\quad\quad\quad\quad |$
$\quad\quad\quad\quad\quad\quad\quad\quad\quad (CH_2)_4$
$\quad\quad\quad\quad\quad\quad\quad\quad\quad |$
$(C_4H_9)_3-Sn-S-(CH_2)_2-OCO.$ Ramsden U.S. Pat. No. 2,885,415 patented May 5, 1969 suggested organotin compounds derived from mercaptoalcohols in which each mercaptyl hydrogen is replaced by a bond to an organotin group, the hydroxyl hydrogen either remaining intact or also being replaced by bonds to the same or other organotin groups. These compounds are defined by the formula:

$$R_nSn(SR'O)_{\frac{4-n+m}{2}}H_m$$

wherein n is 1, 2 or 2; R includes alkyl; R' is selected from the group consisting of aliphatic and aromatic radicals, and m is a number from 0 to 4—n. R' may be derived from any mercaptoalcohol wherein the mercapto group is not inactivated by molecular configuration, such as beta-mercaptoethanol; 3-mercaptopropanol-1; 2-mercaptopropanol-1; 1-mercaptopropanol-2; 2 (or 3 or 4) mercapto-n-butanol-1; o- (or m- or p-) mercaptobenzyl alcohol; etc.

Dorfelt and Lorz U.S. Pat. No. 3,442,852 patented May 6, 1969 proposed organotin stabilizers obtained by reacting an organotin halide having one hydrocarbon group with a mixture of an alkali metal sulfide and an aliphatic alkali metal mercaptide, or an alkali metal salt of a saturated or unsaturated mono or polycarboxylic acid. The products are complex mixtures composed of one or more of the following materials:

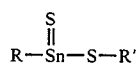

and

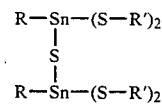

Products with three and more tin atoms linked by sulfur bridges may also form, for example, compounds of the formula:

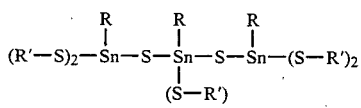

In the above formula R includes alkyl and is directly bound to the tin atom via a carbon atom and R' is the alkyl radical of the mercaptan. Analogous compounds in which —S—R' of the above formulae is replaced by —O—CO—R' are obtained by reacting alkyltin halide, alkali metal sulfide and alkali metal salts of carboxylic acids.

Molt U.S. Pat. No. 3,931,263 patented Jan. 6, 1976 proposed a new method of preparing organotin mercaptides based on the reaction of organotin sulfides with active organic halides in the presence of water. A complex series of reactions is described as follows:

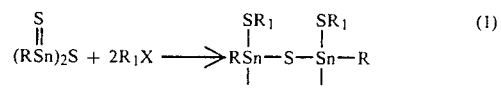

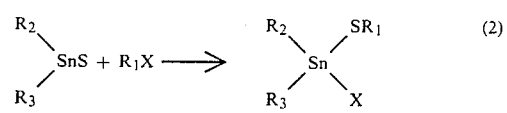

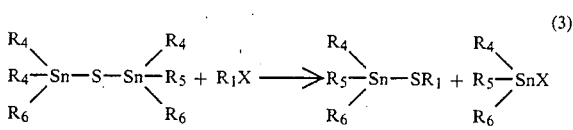

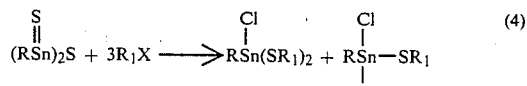

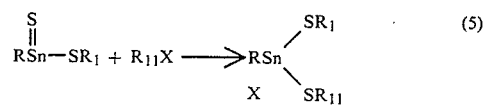

wherein: $R_1$, $R_2$, $R_3$, $R_4$, $R_5$, and $R_6$ are alkyl, usually of one to twenty carbon atoms, cycloalkyl, usually of five to six carbon atoms in the ring, alkenyl, usually of two to twenty or more, frequently three to eighteen carbon atoms, aryl, usually phenyl or alkyl phenyl having one to four carbon atoms in the alkyl group, or aralkyl, usually of seven carbon atoms ($R_1$, $R_2$, $R_3$, $R_4$, $R_5$, and $R_6$ preferably are methyl);

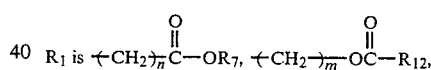

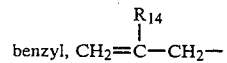

where
$R_{14}$ is hydrogen or methyl;
$R_{11}$ is defined as $R_1$;
$R_7$ is alkyl usually of one to twenty carbon atoms, cycloalkyl usually having five to six carbon atoms in the ring, alkenyl, usually of two to twenty carbon atoms, more commonly three to eighteen carbon atoms, or aralkyl, usually of seven carbon atoms:
$R_{12}$ is alkyl, usually of one to nineteen carbon atoms, or alkenyl usually of two to seventeen carbon atoms;
X is a halogen of atomic weight 35 to 80, i.e., chlorine or bromine;
n is an integer of 1 or 2; and
m is an integer of 2 to 3.

Molt acknowledges that many of the products prepared by this process are old. Thus, Leistner U.S. Pat. No. 2,641,596 discloses some of the nonchlorine-containing compounds prepared by reaction (3). Brecker U.S. Pat. No. 3,565,931 shows many compounds which can be prepared from the compounds made by reaction (1). Hoye U.S. Pat. No. 3,542,825 discloses many compounds prepared by reactions (2) and (4) as does the similar British Pat. No. 1,117,652. Wowk U.S. Pat. No. 3,665,025 and British Pat. No. 1,297,550 disclose some of the compounds prepared by reaction (4) as well as compounds somewhat similar to those prepared in reaction (1).

German Offenlegungsschrift No. 2,503,554 published Sept. 11, 1975 describes the preparation of various methyltin thioethers including methyltin thioglycolates and thioglycolate sulfides.

British Pat. No. 759,382 published Oct. 17, 1956 describes condensation products of hydrocarbontin compounds with mercapto alcohol esters, defined by the formula:

$$R_nSn(SR^1OR^{11})_{4-n}$$

wherein
n is 1, 2 or 3;
R includes alkyl;
$R^1$ is an alkylene or arylene radical, and $R^{11}$ is an acyl group. All the valences of Sn not satisfied by R groups are joined to S atoms.

The organotin sulfides are described in U.S. Pat. No. 2,746,946 to Weinberg et al, dated May 22, 1956. Polymeric organotin sulfides having a high proportion of tin and sulfur by weight have also been suggested. Examples of such materials are given in U.S. Pat. No. 3,021,302 to Frey, dated Feb. 13, 1962, which discloses polymeric condensation products of hydrocarbon stannonic acid, hydrocarbon thiostannonic acid and co-condensation products of these materials. However, all of these materials have suffered from one or another failing, which until now has prevented their coming into general commercial use.

Dutch patent specification No. 6700014, published July 4, 1967, and referring to U.S. application Ser. No. 517,967 filed Jan. 3, 1966, and Ser. No 531,805 filed Mar. 2, 1966, describes combinations of monoalkyltin sulfides with trisubstituted hindered phenols, and optionally, in addition, with organotin mercapto carboxylic acids, mercapto carboxylic acid esters, or mercaptides. The purpose of the addition of the phenol is evidently to avoid the deleterious properties of the organotin sulfide, and the further addition of the organotin mercaptide, mercapto acid or mercapto acid ester supplements the effect of the phenol and of the organotin sulfide in this regard.

Similar disclosures of polymeric organotin compounds, which generally include a chain of tin atoms connected through oxygen or sulfur atoms, are set out in U.S. Pat. Nos. 2,597,920, dated Apr. 15, 1952; U.S. Pat. No. 2,626,953, dated Jan. 27, 1953; U.S. Pat. No. 2,628,211, dated Feb. 10, 1953; U.S. Pat. No. 2,746,946, dated May 22, 1956; U.S. Pat. No. 3,184,430, dated May 18, 1965; and U.S. Pat. No. 2,938,013, dated May 24, 1960.

U.S. Pat. Nos. 3,078,390, 3,196,129 and 3,217,004 describe a series of thioacetal and thioketal organotin carboxylate salt stabilizers which can be prepared in situ by the reaction of thioacetal and thioketal carboxylic acids with dihydrocarbontin oxides or sulfides, or the corresponding monohydrocarbon or trihydrocarbontin compounds.

U.S. Pat. Nos. 3,565,930 and 3,565,931, both patented Feb. 23, 1971, and 3,817,915, patented June 18, 1974, have suggested that the organotin mercaptocarboxylic acid esters are the recognized standard for judging other organotin stabilizers, and considered that the way to improve upon these stabilizers was to increase the amount of tin and sulfur in the molecule. Accordingly, organotin mercaptocarboxylic acid ester sulfides were proposed, having a relatively high concentration of tin, within the range from about 18 to about 35% tin, and from about 10 to about 25% sulfur.

These organotin mercapto acid ester sulfides are defined as organotin compounds having organic radicals linked to tin only through carbon, mercapto sulfur, and sulfide sulfur groups, and have the general formula:

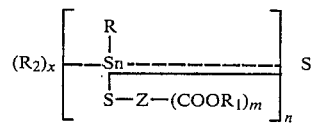

n is an integer from one to two.
m is the number of $COOR_1$ groups, and is an integer from one to four.
x is an integer from zero to one.
R includes alkyl having from about one to about eighteen carbon atoms, and preferably from four to eight carbon atoms.
$R_1$ is an organic group derived from a monohydric or polyhydric alcohol of the formula $R(OH)_{n4}$, where $n_4$ is an integer from one to about four, but is preferably one or two.
$R_2$ is R or S          $(COOR_1)_m$.       is a bivalent alkylene radical carrying the S group in a position alpha or beta to a $COOR_1$ group, and can contain additional free carboxylic acid, carboxylic ester, or carboxylic acid salt groups, and mercapto groups. The radical has from one to about five carbon atoms.

Kauder, U.S. Pat. No. 3,632,538, patented Jan. 4, 1972, provides particularly effective polyvinyl chloride resin stabilizer compositions having a relatively high concentration of tin, within the range from about 20 to about 35% Sn, and a relatively high concentration of sulfur, within the range from about 10 to about 25% S, and comprising (a) an organotin α- or β-mercapto carboxylic acid ester, and (b) an organotin sulfide.

The organotin sulfides contain groups linked to tin only through carbon, and a sulfide sulfur group, =S, wherein the sulfide sulfur valences are linked to the same tin atom or to different tin atoms. Each compound contains per tin atom one or two hydrocarbon or heterocyclic groups linked to tin through carbon. For best results, Kauder states, and to obtain a synergistic stabilizing effectiveness, at least one of the compounds of the combination of this invention should contain only one hydrocarbon group per tin atom, linked to tin through a carbon atom. This combination generally improves the initial color of a resin composition during heating, i.e., during the first thirty minutes of a heat test, and can also improve the long-term stability before final charring.

It has also been suggested that combinations of monoalkyltin and dialkyltin mercapto compounds are superior to the mono- or the dialkyltin mercapto compounds alone. Weisfeld U.S. Pat. Nos. 3,640,950 and 3,925,309 and Brecker U.S. Pat. No. 3,787,357 disclose various combinations of this type, but they are not however as effective in inhibiting the development of an early discoloration during the first fifteen minutes of heating.

Kugele, U.S. Pat. No. 4,062,881, patented Dec. 13, 1977, provides monoorganotin and/or diorganotin mercaptoalkyl carboxylate monosulfides and/or polysulfides useful as stabilizers for improving the resistance to deterioration of vinyl chloride polymers (e.g., vinyl chloride resins) when heated at 350° F. having at least two tin atoms linked together only through sulfide sulfur and having tin atoms linked to said tin atoms one to two hydrocarbon groups (e.g., alkyl, aryl, cycloalkyl, aralkyl or alkenyl having from one to twenty carbon atoms), and linked to the tin through carbon, at least one mercaptoalkyl carboxylic acid ester group linked to tin through the sulfur of the mercaptoalkyl group, the organotin compound having an amount of tin within the range from 10 to 42% by weight and an amount of sulfur within the range from 8 to 42% by weight.

The compounds are said to have the formula:

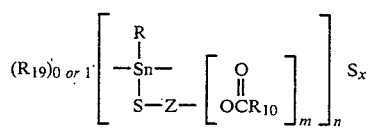

where R includes alkyl, and R usually has one to twenty carbon atoms, $R_{19}$ is R or

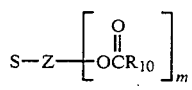

where Z is a polyvalent alkylene or hydroxyalkylene radical of at least two carbon atoms and usually not over twenty carbon atoms, the valence of Z being $m+1$, $R_{10}$ is hydrogen, alkyl, aryl, aralkyl, cycloalkyl, aralkenyl, alkenyl having up to 3 ethylenic double bonds, hydroxy-alkyl, hydroxyalkenyl or $-R_{14}COOR_{23}$, where $R_{14}$ is $(CH_2)_p$, phenylene or $-CH=CH-$ where p is 0 or an integer up to 8 and $R_{23}$ is alkyl of one to twenty carbon atoms, cycloalkyl of five to six carbon atoms, alkenyl of two to twenty carbon atoms, aryl, e.g., phenyl or tolyl or benzyl. $R_{10}$ can have one to nineteen carbon atoms or more when it is a hydrocarbon or hydroxy-hydrocarbon group, m is the number of $OOCR_{10}$ groups, m is an integer of 1 to 3, n is an integer of 1 to 2 and x is 1 to 10, usually 1 to 4.

In addition to these compounds, there can also be employed overbased tin compounds by reacting a compound of the formula:

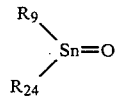

where $R_{24}$ is defined as $R_9$ in an amount of up to 2 moles per available carboxyl group with such tin sulfides. The "overbased" product can be obtained simply by dissolving the dihydrocarbyltin oxide in the tin mercaptoalkyl carboxylic acid ester sulfide, for example.

In accordance with U.S. Pat. No. 4,255,320, patented Mar. 10, 1981 to Brecker and Keeley, stabilizer mixtures for extrudable rigid polyvinyl chloride resin compositions are provided, composed of a mixture of a monoalkyltin 2-acyloxyethylmercaptide, of a dialkyltin 2-acyloxyethylmercaptide, or both, with a dialkyltin and/or monoalkyltin sulfide. These stabilizer mixtures are remarkably effective in inhibiting the development of early discoloration when the composition is heated at 375° F. during the first five or ten minutes up to approximately twenty or even thirty minutes of heating, even in the presence of substantial proportions of lubricating metal carboxylate salts, such as calcium stearate. This effect is particularly remarkable in view of the fact that such lubricants and particularly calcium stearate impart a yellow discoloration initially to the resin composition, even before heating is begun. In the presence of the stabilizer systems of the invention, however, this initial yellow discoloration does not appear, and the development of such discoloration is inhibited for at least the first ten to twenty minutes of heating.

The monoalkyltin 2-acyloxyethylmercaptides are defined by the formula:

The dialkyltin 2-acyloxyethylmercaptides are defined by the formula:

In these formulae $R_1$ is an aliphatic hydrocarbon group having from one to about twenty-six carbon atoms in a straight or branched chain.

$R_4$ is H or

not more than one $R_4$ being H.

$R_2$ and $R_3$ are a hydrogen atom or an aliphatic hydrocarbon group which can be either saturated or ethylenically unsaturated, and has from about one to about twenty carbon atoms. It is apparent from formulae I and II that the esterifying carboxylic acid in the 2-acyloxyethylmercaptide group has an unsubstituted or monosubstituted α-carbon, and branching can occur in the $R_2$ group. Aliphatic acids having two substituents on the α-carbon and aromatic acids do not readily esterify the alcohol hydroxyl of the 2-mercaptoethanol groups $-SCH_2CH_2O-$.

Another liquid stabilizer system enhanced by the highly branched aliphatic hydrocarbons in accordance with the invention is based on two stabilizers:

(1) a liquid barium carbonate-alkyl phenate stabilizer; and (2) a cadmium salt of a carboxylic acid selected from the group consisting of branched chain aliphatic carboxylic acids having from about eight to about ten carbon atoms and mixtures thereof in an amount of at least 85% with up to about 15% of one or more cadmium salts of aromatic carboxylic acids having from about seven to about eleven carbon atoms, and saturated or unsaturated straight chain aliphatic carboxylic acids having from about nine to about twenty-two carbon atoms; the sum of the weight percent of barium and the weight percent of cadmium being at least 18%; and the ratio of the weight percent of cadmium to the weight percent of barium Cd:Ba being within the range from about 0.4:1 to about 1.2:1.

These ingredients form a homogeneous storage-stable liquid. These systems are described in U.S. Pat. No. 4,401,779 patented Aug. 30, 1983 to Bae and Brecker.

Cadmium salts of mixtures of branched-chain aliphatic acids and aromatic acids or straight chain unsaturated or saturated aliphatic acids appear to offer an enhanced stabilizing effectiveness, and are therefore preferred.

Because of their mutual solubility, it is possible to incorporate an extraordinarily high proportion of the barium carbonate-alkyl phenate and cadmium carboxylate. The minimum is 18 weight percent total Ba plus Cd, calculated as the metal, and the total can range to as high as 22%, and even as high as 25%.

It further appears that the carboxylic acid anion of the cadmium salt is important to stabilizing effectiveness. The cadmium salts of saturated straight chain aliphatic carboxylic acids having from five to eight carbon atoms, for example, are not nearly as effective as the cadmium salts of the acids within the above-described classes. The reason for this is not at present understood.

The liquid barium carbonate-alkyl phenate is known and described in U.S. Pat. No. 3,787,357, patented Jan. 22, 1974, to Lawrence Robert Brecker. The barium carbonate is combined with at least one barium alkyl phenate, usually in a relatively nonvolatile organic liquid, which acts as a liquefying agent for the carbonate, by itself or in combination with a nonvolatile polar compound. The barium alkyl phenate disperses the carbonate in the organic solvent during or after its formation.

The relatively nonvolatile organic liquid can be a hydrocarbon oil, a plasticizer, an epoxy ester, etc., or a combination thereof.

The proportion of barium carbonate to organic salt in this carbonate-organic salt combination is defined by the metal ratio, which is a number greater than 2, i.e., the number of metal equivalents is greater than the number of equivalents of the organic acid residue of the organic salt. The metal ratio can be as high as 20, or even higher, the limit being imposed only by an unacceptably high viscosity of the barium carbonate-barium alkyl phenate combination.

The alkyl phenate residue of the barium alkyl phenate has at least ten carbon atoms. There is no upper limit for the carbon content except that set by the availability of materials. Barium alkyl phenates with as many as 150 carbon atoms in the alkyl phenate residue give excellent results.

Exemplary alkyl phenols that can be used as their barium salt include secondary butyl-phenol, o-amyl-phenol, heptyl-phenol, tert-nonyl-phenol, capryl-phenol, 6-t-butyl-2,4-dimethyl-phenol, 2,6-di-tert-butyl p-cresol, p-t-octyl-phenol, di-nonyl-phenol, decyl-phenol, dodecyl-phenol, and paraffin wax-alkyl-phenol; cycloalkyl-phenols such as o-cyclohexyl-phenol, p-cyclohexylphenol, and cyclooctyl-p-cresol; aralkyl-phenols such as 4-benzyl-o-cresol and ortho- and para-alphamethylbenzyl-phenols, and mixtures thereof.

The barium alkyl phenate salt may contain free unreacted phenol.

These barium carbonate-barium alkyl phenates are visually clear liquids, and leave no residue on filtration.

The cadmium carboxylate is a salt of a nonnitrogenous branched chain aliphatic carboxylic acid having from about eight to about ten carbon atoms, or a mixture of at least 85% thereof with at least 15% of a carboxylic acid selected from the group consisting of (a) aromatic carboxylic acids having from about seven to about eleven carbon atoms; and (b) unsaturated and saturated straight chain aliphatic carboxylic acids having from about nine to about twenty-two carbon atoms.

Exemplary branched chain aliphatic carboxylic acids include 2-ethyl hexoic acid, isooctoic acid, 3,5,5-trimethyl hexoic acid, neodecanoic acid, and 2-methyl-2-ethyl hexoic acid.

Exemplary saturated straight chain aliphatic acids include capric acid, pelargonic acid, lauric acid, palmitic acid, myristic acid, stearic acid, and behenic acid.

Exemplary unsaturated straight chain aliphatic carboxylic acids include oleic acid, linoleic acid, linolenic acid, ricinoleic acid and erucic acid.

Exemplary aromatic acids include benzoic acid, ortho-, meta- and para-toluic acid; ortho-, meta- and para-ethylbenzoic acid; ortho-, meta- and para-butyl benzoic acid; ortho-, meta- and para-amyl benzoic acid; the various dimethyl benzoic acid isomers; the various diethyl benzoic acid isomers; and the various trimethyl benzoic acid isomers.

The cadmium carboxylate can be a liquid or a solid, in which case it is soluble in the liquid stabilizer system. A solid cadmium carboxylate can also be liquefied in course of preparation by carrying out the formation of the salt in the presence of a high-boiling organic solvent for the resulting cadmium carboxylate. This solvent will then be present in the finished cadmium salt, and accompany it in the blending with the other components of the liquid stabilizer system. The solvent, if used, should have a boiling point of at least 180° C., and the maximum amount should not exceed 17% solvent by weight of the stabilizer system, after combination of the liquefied cadmium carboxylate with the other components.

Useful solvents include aliphatic, cycloaliphatic, and aromatic hydrocarbons; aliphatic, cycloaliphatic and aromatic alcohols, ether alcohols, and ether alcohol esters; and esters of organic and inorganic acids, such as the alkyl, cycloalkyl and aryl phosphoric acid esters, benzoic acid esters, and stearic acid esters. Illustrative preparations of the liquefied cadmium carboxylate are given in the Examples.

The liquid stabilizer systems of the invention are effective in enhancing the resistance to deterioration by heat and light of any polyvinyl chloride resin. The term "polyvinyl chloride" as used herein is inclusive of any polymer formed at least in part of the recurring group:

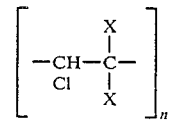

and having chlorine content in excess of 40%. In this group, the X groups can each be either hydrogen or chlorine, and n is the number of such units in the polymer chain. In polyvinyl chloride homopolymers, each of the X groups is hydrogen. Thus, the term includes not only polyvinyl chloride homopolymers but also after-chlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The stabilizer systems are effective also with mixtures of polyvinyl chloride in a major proportion with a minor proportion of other synthetic resins such as chlorinated polyethylene or a copolymer of acrylonitrile, butadiene and styrene.

These liquid stabilizer systems are of particular application to the stabilization of rigid polyvinyl chloride resin compositions, that is, resin compositions which are formulated to withstand high processing temperatures, of the order of 375° F. and higher, and whose mechanical strength would be adversely affected by an unduly high amount of liquid or low melting additive.

The polyvinyl chloride resin can be in any physical form, including, for example, powders, films, sheets, molded articles, foams, filaments, and yarns.

A sufficient amount of the stabilizer system is used to enhance the resistance of the polyvinyl chloride to deterioration in physical properties, including, for example, discoloration and embrittlement, under the heat and/or light conditions to which the polymer will be subjected. Very small amounts are usually adequate. Amounts within the range from about 0.01 to about 5% liquid stabilizer system by weight of the polyvinyl chloride resin are satisfactory. Preferably, an amount within the range from about 0.1 to about 2% is employed for optimum stabilizing effectiveness.

When all of the essential components are liquids, the liquid stabilizer systems of the invention are readily formed as homogeneous liquids by simple blending and mutual dissolution, with heating, if necessary, and comprise a blend of:

(a) liquid polyvinyl chloride resin stabilizer, such as alkyl tin sulfur-linked compound or cadmium carboxylate barium carbonate-barium alkyl phenate, in an amount within the range from about 60 to about 95 parts by weight; and (b) highly branched alpha-olefin oligomer in an amount within the range from about 5 to about 40 parts by weight.

The liquid stabilizer systems of the invention can be employed with other conventional stabilizers for other purposes.

Any of the conventional polyvinyl chloride resin additives, such as lubricants, plasticizers, emulsifiers, antistatic agents, flame-proofing agents, pigments and fillers, can be employed. Surprisingly however, the incorporation of the highly branched alpha-olefin oligomer in many instances makes it possible to omit the usual solid lubricants, since the lubricating effect they contribute is apparently contributed by the highly branched alpha-olefin oligomer. Thus, for example, in typical pipe compositions, the solid lubricants can usually be omitted.

Preferably, the stabilizer system is added to the polyvinyl chloride resin in an amount to provide in the resin from about 0.05 to about 2% of the polyvinyl chloride resin stabilizer and from about 0.03 to about 0.8% total of the highly branched alpha-olefin oligomer.

The stabilizer system is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polyvinyl chloride resin can be worked into the desired shape, such as by milling, calendering, extrusion or injection molding, or fiber-forming. In such operations, it will be found to have a considerably improved resistance to discoloration and embrittlement on exposure to heat and light.

The stabilizer systems of the invention are recommended for use in the extrusion of rigid profiles such as siding and window frames where outstanding weatherability is required, and provide excellent light stability as compared to the sulfur-containing organotin stabilizers in common use for this application.

Because of the superior light stability provided, resin formulations containing lower levels of titanium dioxide may be produced, resulting in significant cost savings, typically 4 parts per hundred of resin $TiO_2$ instead of 10 parts per hundred of resin with tin. Four parts per hundred of resin $TiO_2$ plus 6 parts per hundred of resin $CaCO_3$ in the compound gives higher heat distortion than 10 parts per hundred of resin $TiO_2$.

These systems are also particularly well suited for the manufacture of dark colored extrudates. Dark colors absorb more heat from the sun and therefore need higher resistance to heat distortion and more initial resistance to long term aging than light colors.

Since epoxy plasticizers or phosphite chelators are not required, heat deflection temperatures are comparable to those obtained with liquid organotin stabilizers. These systems also provide freedom from plate-out and dusting, often encountered with solid barium-cadmium systems.

The effectiveness of the stabilizer compositions in accordance with the invention including both a polyvinyl chloride resin stabilizer and a liquid alpha-olefin oligomer lubricant is evaluated in a Brabender Plasticorder at a temperature of 190° C. at speeds from 35 to 60 rpm with full access of air. These conditions provide stock temperatures between 190° C. and 210° C. The Brabender Plasticorder mechanically works the composition while heating it. Oven heating of the compositions of the invention without working does not demonstrate the advantages of the invention, because of the absence of working. The Brabender Plasticorder is a conventional laboratory test instrument, and is described for example in Encyclopedia of PVC, Leonard, New York and Basel (1973), Marcel Dekker Nass, Inc., Volume 2 pages 970–983.

The following Examples in the opinion of the inventors represent preferred embodiments of the invention.

EXAMPLES 1 to 8

A series of white pigmented polyvinyl chloride resin homopolymer pipe compositions were prepared having the following formulation:

|  | Parts by Weight |
| --- | --- |
| Conoco PVC 5385 (polyvinyl chloride homopolymer) | 100 |
| Titanium dioxide | 1 |
| Stearate-coated calcium carbonate | 3 |
| Calcium stearate | 0.5 |
| Paraffin wax (m.p. 160° F.) | 1 |
| Polyethylene wax | 0.1 |

-continued

| | Parts by Weight |
|---|---|
| 88:12 Blend of methyltintris (2-fatty acyloxyethylmercaptide) of tall oil fatty acids and dimethyltin sulfide | Amount shown in Table II |
| Lubricant | As shown in Table II |

The formulations were compounded on a two-roll mill at 190° C. and then sheeted off. 75 g portions of the milled sheets were tested for heat and working stability in the Brabender Plasticorder at 190° C. and 35 rpm, with free access of air. The following results were obtained:

TABLE I

| Example No. | Methyltin Phr | Lubricant | Phr | Minutes to Yellow | Minutes to Darken |
|---|---|---|---|---|---|
| Control A | 0.3 | None | | 7 | 13 |
| Control B | 0.4 | None | | 9 | 13 |
| Control C | None | Hydrogenated 1-decene oligomer viscosity 8 cs | 0.4 | 0 (yellow-orange as milled) | |
| Control D | 0.3 | Tripropylene glycol | 0.1 | 7 | 13 |
| Control E | 0.3 | Polyisobutylene | 0.1 | 7 | 15 |
| 1 | 0.3 | Hydrogenated 1-decene oligomer viscosity 8 cs | 0.1 | 11 | 18 |
| 2 | 0.3 | Hydrogenated 1-decene oligomer viscosity 6 cs | 0.1 | 10 | 20 |
| 3 | 0.3 | Hydrogenated 1-decene oligomer viscosity 4 cs | 0.1 | 10 | 17 |
| 4 | 0.3 | Blend of: Hydrogenated 1-decene oligomer viscosity 8 cs | 0.08 | 10 | 17 |
| | | Hydrogenated 1-decene oligomer viscosity 40 cs | 0.02 | | |
| 5 | 0.3 | 1-decene oligomer not hydrogenated | 0.1 | 11 | 19 |

A second group of tests were run using milled sheets as before of the same formulation, but operating the Brabender Plasticorder at 190° C. and 45 rpm, with the following results:

TABLE II

| Example No. | Methyltin Phr | Lubricant | Phr | Minutes to Yellow | Minutes to Darken |
|---|---|---|---|---|---|
| Control F | 0.3 | Fatty acyloxyethyl mercaptan of tall oil | 0.1 | 11 | 18 |
| 6 | 0.3 | Hydrogenated 1-decene oligomer viscosity 8 cs | 0.1 | 13 | 15 |
| Control G | 0.45 | Fatty acyloxyethyl mercaptan of tall oil | 0.15 | 11 | 18 |
| 7 | 0.45 | Hydrogenated 1-decene oligomer viscosity 8 cs | 0.15 | 15 | 28 |
| Control H | 0.6 | Fatty acyloxyethyl mercaptan of tall oil | 0.2 | 15 | 21 |
| 8 | 0.6 | Hydrogenated 1-decene oligomer viscosity 8 cs | 0.2 | 21 | 35 |

TABLE II-continued

| Example No. | Methyltin Phr | Lubricant | Phr | Minutes to Yellow | Minutes to Darken |
|---|---|---|---|---|---|
| | | viscosity 8 cs | | | |

It is apparent from the above results that the compositions in accordance with the invention containing both organotin stabilizer and liquid alpha-olefin oligomer lubricant demonstrate a considerably enchanced stabilizing effect as compared to either the organotin compound taken alone (Controls A and B) or the alpha-olefin oligomer taken alone (Control C) as well as other lubricants that are not alpha-olefin oligomers (Controls D, E, F, G and H).

It should be noted that the amount of liquid alpha-olefin oligomer lubricant used is considerably less than the amount of solid lubricant, calcium stearate, paraffin wax, and polyethylene wax.

EXAMPLE 9

A white pigmented polyvinyl chloride resin siding composition was prepared, having the following formulation:

| | Parts By Weight |
|---|---|
| Geon 110 × 450 PVC (polyvinyl chloride homopolymer) | 100 |
| Titanium dioxide | 5 |
| Methacrylate-butadiene-styrene impact modifier (KM 323) | 7 |
| Acrylic process aid (K 120N) | 2 |
| Paraffin wax (m. 160° F.) | 0.9 |
| Calcium stearate | 0.6 |
| Polyethylene wax | 0.2 |
| Dimethyltin bis(isooctyl thioglycolate) | As shown in Table III |
| Lubricant | |

These formulations were compounded on a two-roll mill at 190° C. and then sheeted off. 75 g portions of each milled sheet were run in the Brabender Plasticorder at 190° C. and 55 rpm, with the following results:

TABLE III

| Example No. | Methyltin Phr | Lubricant | Phr | Minutes to Yellow | Minutes to Darken |
|---|---|---|---|---|---|
| Control J | 2.0 | None | — | 13 | 22 |
| Control K | 1.2 | None | — | 10 | 16 |
| 9 | 1.2 | Hydrogenated 1-decene oligomer viscosity 8 cs | 0.8 | 19 | 40 |

It is apparent that the liquid alpha-olefin oligomer lubricant considerably enhanced the stabilizing effect of the dimethyltin bis (isooctyl thioglycolate).

EXAMPLE 10

A white pigmented polyvinyl chloride resin siding composition was prepared, having the following formulation:

| | | Parts by Weight |
|---|---|---|
| Diamond 450 PVC (polyvinyl chloride homopolymer) | | 100 |
| Titanium dioxide | | 5 |
| Calcium carbonate (Atomite) | | 5 |
| MBS impact modifier (KM 323) | | 7 |
| Paraffin wax 160° F. | | 1 |
| Polyethylene wax | | 0.3 |
| Stearic acid | | 0.3 |
| Liquid cadmium 2-ethylhexoate (20% Cd) | 40% by weight | As shown in Table IV |
| Barium nonyl-phenate-barium-carbonate (26.5% Ba) | 60% by weight | |

The siding composition was milled in a two-roll mill at 190° C. for two minutes and then sheeted off. 75 g samples of the milled sheets were tested in the Brabender Plasticorder at 190° C. and 45 rpm, with the following results:

TABLE IV

| Example No. | Ba—Cd Stabilizer (Phr) | Lubricant | Phr | Minutes to Yellow | Minutes to Darken |
|---|---|---|---|---|---|
| Control L | 2.0 | None | — | 16 | 25 |
| 10 | 1.8 | Hydrogenated 1-decene oligomer viscosity 8 cs | 0.2 | 25 | 31 |
| Control M | 1.5 | None | — | 13 | 19 |
| 11 | 1.35 | Hydrogenated 1-decene oligomer viscosity 8 cs | 0.15 | 19 | 25 |

It is apparent that the liquid alpha-olefin oligomer lubricant considerably enhanced the stabilizing effect of the liquid cadmium 2-ethylhexoate barium nonylphenate-barium carbonate stabilizer.

EXAMPLE 12

A white pigmented polyvinyl chloride resin siding composition was prepared, having the following formulation:

| | Parts by Weight |
|---|---|
| Geon 110 × 450 PVC (polyvinyl chloride homopolymer) | 100 |
| Titanium dioxide | 10 |
| Methacrylate-butadiene-styrene impact modifier (KM 323) | 7 |
| Acrylic process aid (K 120N) | 2 |
| Paraffin wax (m. 160° F.) | 0.9 |
| Calcium stearate | 0.6 |
| Polyethylene wax | 0.2 |
| Lubricant | As shown in Table V |
| Mixed dimethyltin isooctyl thioglycolate-isooctyl maleate (Example 12) | As shown in Table V |
| Dimethyltinbisisooctyl thioglycolate (Example 13) | |

The formulations were milled on a two roll mill at 190° C. for two minutes, and then sheeted off. 75 g samples of the milled sheets were tested in the Brabender Plasticorder at 190° C. at 45 rpm, with the following results:

TABLE V

| Example No. | Methyltin Phr | Lubricant | Phr | Minutes to Yellow | Minutes to Darken |
|---|---|---|---|---|---|
| Control N | 2.0 | None | — | 13 | 19 |
| 12 | 1.59 | Hydrogenated 1-decene oligomer viscosity 8 cs | 0.41 | 19 | 35 |
| Control P | 2.0 | None | — | 10 | 30 |
| 13 | 1.46 | Hydrogenated 1-decene oligomer viscosity 8 cs | 0.54 | 13 | 37 |

It is apparent from the above results that the liquid alpha-olefin oligomer lubricant considerably enhances the stabilizing effect of the mixed dimethyltin isooctyl thioglycolate/isooctyl maleate and dimethyltin bis-(isooctyl thioglycolate).

EXAMPLES 14 AND 15

A white pigmented polyvinyl chloride resin composition was prepared from a commercially available white pigmented polyvinyl resin homopolymer composition, to which stabilizer had to be added having the following formulation, as well as oligomer lubricant as shown in Table VI.

| Example No. | Stabilizer | Parts by Weight |
|---|---|---|
| Q | butyltin IOTG-sulfide | 0.8 |
| | dibutyltin IOTG | 1.1 |
| | 2,6-di-t-butyl-p-cresol | 0.1 |
| 14 | butyltin IOTG-sulfide | 0.8 |
| | dimethyltin (IOTG)₂ | 0.8 |
| 15 | butyltin IOTG-sulfide | 0.75 |
| | dimethyltin (IOTG)₂ | 0.75 |

The formulations were milled on a two-roll mill at 190° C. and then sheeted off. 75 g samples of the milled sheets were tested in the Brabender Plasticorder at 190° C. and 45 rpm, with the results shown in the Table VI:

TABLE VI

| Example No. | Lubricant | Phr | Minutes to Yellow | Minutes to Darken |
|---|---|---|---|---|
| Control Q | None | — | 9 | 12 |
| 14 | Hydrogenated 1-decene oligomer viscosity 8 cs | 0.4 | 11 | 14 |
| 15 | Hydrogenated 1-decene oligomer viscosity 8 cs | 0.5 | 11 | 14 |

Having regard to the foregoing disclosure, the following is claimed as the inventive and patentable embodiments thereof:

1. A polyvinyl chloride resin stabilizer composition for reducing deterioration of polyvinyl chloride polymers when heated and worked comprising a polyvinyl chloride resin stabilizer and a highly branched alpha-olefin oligomer obtained by oligomerization of a 1-olefin having from about six to about twelve carbon atoms, and having alkyl branches of at least two carbon atoms, the alpha-olefin oligomer being in an amount which enhances the stabilizing effect of the polyvinyl chloride resin stabilizer.

2. A polyvinyl chloride resin stabilizer composition according to claim 1 in the form of a homogeneous stable liquid at room temperature.

3. A polyvinyl chloride resin stabilizer composition according to claim 1, in which the highly branched alpha-olefin oligomer has alkyl substitutents of at least two carbon atoms ranging up to about twelve carbon atoms.

4. A polyvinyl chloride resin stabilizer composition according to claim 1, in which the alpha-olefin oligomer ranges in molecular size from $C_{30}$ to about $C_{60}$.

5. A polyvinyl chloride resin stabilizer composition according to claim 4 in which the oligomer has a viscosity at 100° C. of from 4 to 100 centistokes.

6. A polyvinyl chloride resin stabilizer composition according to claim 5 in which the oligomer is 1-decene.

7. A polyvinyl chloride resin stabilizer composition according to claim 5 in which the oligomer has a viscosity up to about 15 centistokes.

8. A homogeneous liquid stabilizer composition according to claim 7 in which the polyvinyl chloride resin stabilizer is selected from the group consisting of alkyltin mercapto acid ester and barium-cadmium liquid polyvinyl chloride resin stabilizers.

9. A polyvinyl chloride resin stabilizer composition according to claim 5 in which the oligomer is an oligomer of a 1-olefin selected from the group consisting of 1-hexene, 1-heptene, 2-ethyl-hexene, 1-octene, 1-decene, 1-undecene and 1-dodecene and the alkyl branches are selected from the group consisting of ethyl, propyl, isopropyl, butyl, isobutyl, tert-butyl, amyl, isoamyl, hexyl, isohexyl, heptyl, isoheptyl, octyl, 2-ethylhexyl, isooctyl, nonyl, isononyl, decyl, undecyl, and dodecyl, and are present in complex mixtures along the hydrocarbon molecule.

10. A polyvinyl chloride resin stabilizer composition according to claim 1 in which the polyvinyl chloride resin stabilizer is an organotin compound having linked to tin from one to three alkyl groups having from one to about eighteen carbon atoms, and from one to three organic groups linked to tin through sulfur.

11. A polyvinyl chloride resin stabilizer composition according to claim 10 in which the organotin compound is selected from the group consisting of alkyl tin mercapto carboxylic acid esters; and alkyl tin mercaptoalcohol esters of dicarboxylic acid monoalky esters.

12. A polyvinyl chloride resin stabilizer composition according to claim 1 in which the stabilizer is a liquid cadmium carboxylate-carbonated barium alkyl phenate.

13. A polyvinyl chloride resin composition having an enhanced resistance to deterioration when heated and worked, comprising a polyvinyl chloride resin, a polyvinyl chloride resin stabilizer, and a highly branched alpha-olfin oligomer obtained by oligomerization of a 1-olefin having from about six to about twelve carbon atoms, and having alkyl branches of at least two carbon atoms, the alpha-olefin oligomer being in an amount to enhance the stabilizing effect of the polyvinyl chloride resin stabilizer.

14. A polyvinyl chloride resin composition according to claim 13 in which the polyvinyl chloride resin contains a plasticizer in an amount of less than 10%.

15. A polyvinyl chloride resin composition according to claim 13 in which the polyvinyl chloride resin is unplasticized.

16. A rigid polyvinyl chloride resin composition in accordance with claim 13 in which the polyvinyl chloride resin is polyvinyl chloride homopolymer.

17. A rigid polyvinyl chloride resin composition in accordance with claim 13 in which the amount of stabilizer composition is within the range from about 0.01 to about 5% by weight of the composition.

* * * * *